2 Sheets—Sheet 1.
H. GUELS.
Assignor, by mesne assignments, to THE WESTINGHOUSE AIR BRAKE COMPANY.
AUTOMATIC AIR BRAKE SYSTEM.
No. 11,070. Reissued Apr. 15, 1890.
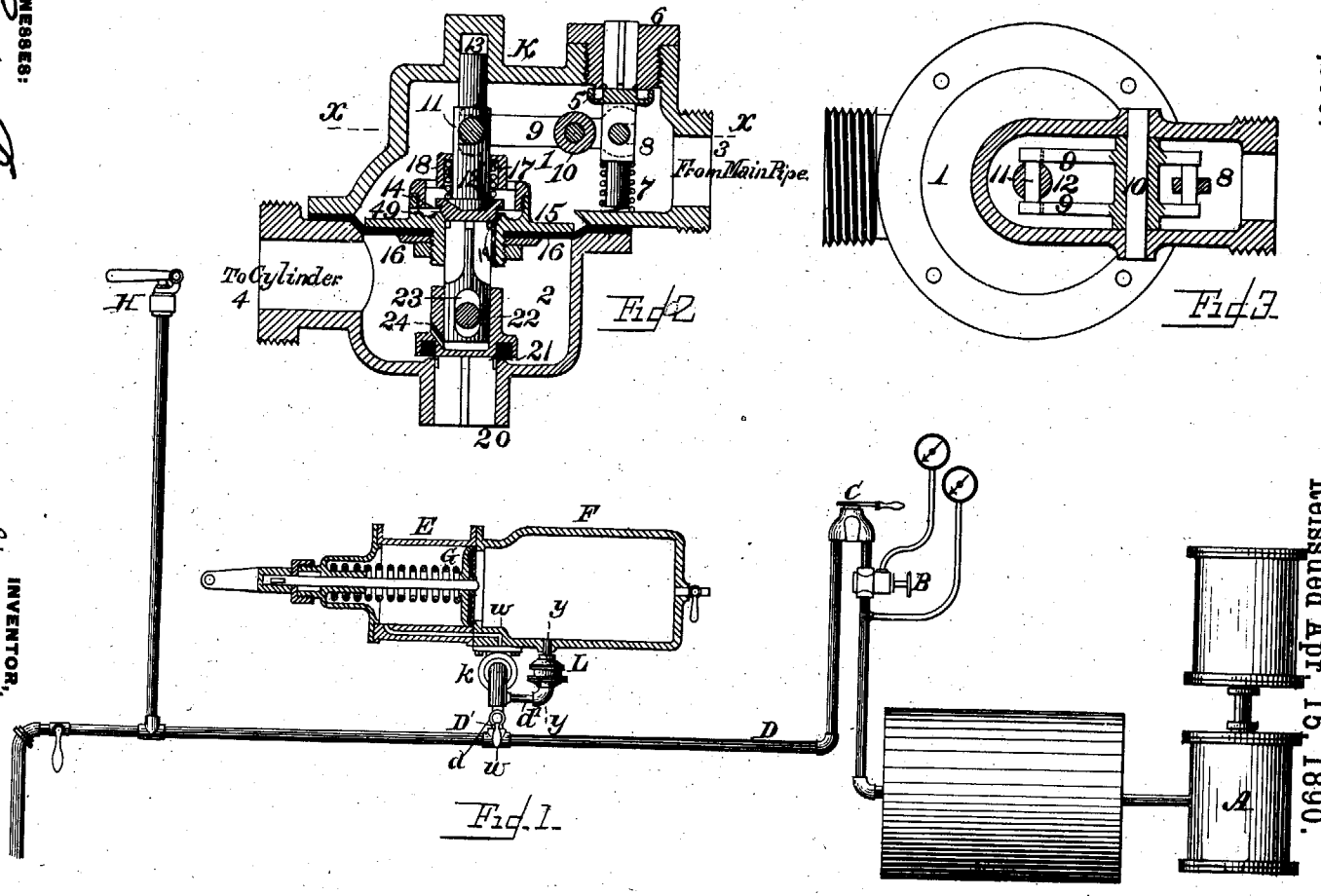
WITNESSES:
J. Thorndike Bell.
F. E. Gaither
INVENTOR,
Herman Guels,
by Geo. H. Christy Atty.
for him and his Assignee 2 Sheets—Sheet 2.

H. GUELS.

Assignor, by mesne assignments, to THE WESTINGHOUSE AIR BRAKE COMPANY.

AUTOMATIC AIR BRAKE SYSTEM.

No. 11,070. Reissued Apr. 15, 1890.

WITNESSES:

John Andrew Bell

F. E. Gardner

INVENTOR,

Herman Guels by George N. Christy Atty.

for him and his Assignees

UNITED STATES PATENT OFFICE.

HERMAN GUELS, OF ST. LOUIS, MISSOURI, ASSIGNOR, BY MESNE ASSIGNMENTS, TO THE WESTINGHOUSE AIR BRAKE COMPANY, OF PITTSBURG, PENNSYLVANIA.

AUTOMATIC AIR-BRAKE SYSTEM.

SPECIFICATION forming part of Reissued Letters Patent No. 11,070, dated April 15, 1890.

Original No. 384,687, dated June 19, 1888. Application for reissue filed March 14, 1890. Serial No. 343,941.

*To all whom it may concern.*

Be it known that I, HERMAN GUELS, a citizen of the United States, residing at St. Louis, in the State of Missouri, have invented certain new and useful Improvements in Automatic Air-Brake Systems; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

Figure 4:
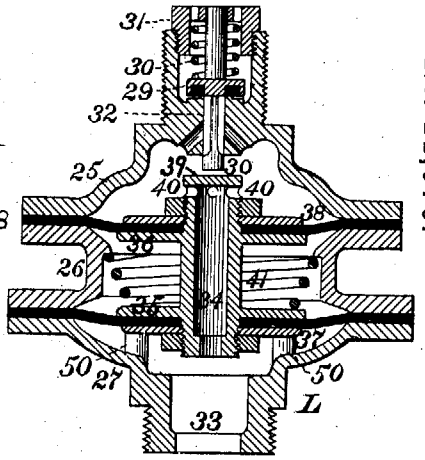
Figure 6:
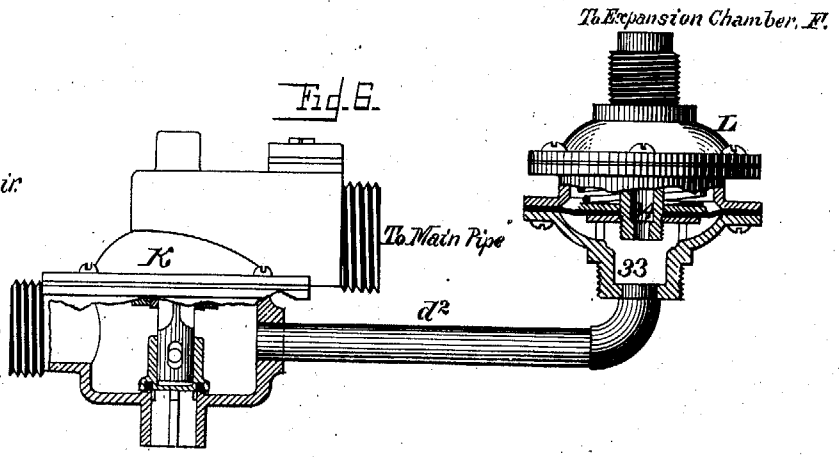
Figure 5:
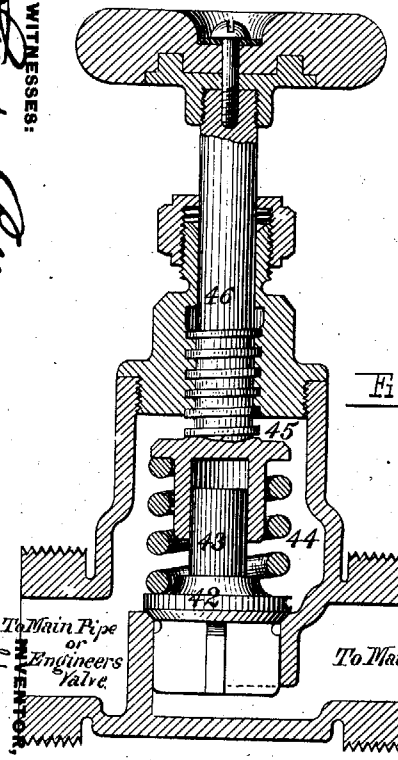

Figure 1 is a plan view of the system, the brake-cylinder being in section. Fig. 2 is a sectional view of the automatic compound exhaust-valve on the line *w w*, Fig. 1. Fig. 3 is a section of the automatic valve on the line *x x*, Fig. 2. Fig. 4 is a section of the check-valve-operating device on the line *y y*, Fig. 1. Fig. 5 is a section of the reducing-valve on the line of the air-pipes. Fig. 6 is a sectional view showing a modified arrangement of the check-valve-operating device with relation to the automatic supply and exhaust valve.

Like letters and figures refer to like parts wherever they occur.

The main difficulties which have been heretofore encountered in air-brake systems have been, first, the loss of appreciable time or interval between the application of the brakes on the successive cars; and, second, the loss of time and the high pressure required in the main supply-pipe before the brakes could be released.

The first difficulty has arisen from the inability to quickly and uniformly reduce the pressure simultaneously at all points in the main pipe, or at all the cylinders simultaneously, and attempts have been made to overcome the same by electrically-actuated exhaust-valves or bleeders, and also by bleeding the main supply-pipe at several points in its length.

The second difficulty or slowness in releasing the brakes has arisen from the necessity in the equilibrio system of raising the pressure in the main supply-pipe and in the cylinder to or above the pressure of the air in the auxiliary reservoir, or that exerted on the opposite side of the piston, before an equilibrium could be established on both sides of the piston which would allow the springs (commonly employed for the purpose) to withdraw the brakes. So far as I am aware, no means has heretofore been provided to overcome this second difficulty.

The first object of my invention is, therefore, to secure the quick discharge of the air from the main supply or train pipe, so that the automatic valves may be operated in rapid succession, and this I accomplish by opening the main supply or train pipe at points adjacent to the several cylinders. Simultaneously with this, as is usual in devices of the kind illustrated in the drawings, the brake-cylinder pistons are brought into action by opening the cylinders direct to the atmosphere, and not through the train-pipe.

The second object of my invention is to rapidly equalize the pressure on both heads of the piston when the brakes are to be released, in order to allow the spring which retracts the brakes to act quickly, and this I accomplish by means of mechanism which causes a comparatively low pressure in the train (or main supply) pipe to trip the check-valve and restore the equilibrium of the piston or equalize the pressure on both sides of the piston, and in default of a better name I shall hereinafter refer to mechanism for said purpose as a "check-valve-operating device." For this purpose any of the well-known mechanism for automatically multiplying power may be employed.

I will now proceed to describe the preferred form of my invention, so that others skilled in the art to which it appertains may apply the same.

I have chosen for purposes of illustration that class of air-brakes wherein the piston which applies the brakes is maintained in equilibrio by compressed air on both sides of the piston, the brakes being applied by destroying the equilibrium and released by restoring the equilibrium, and in order to save space have confined the illustration to the devices for a single car, as it will be understood that any number of cars may be used, all being equipped like the one shown.

In the drawings, A indicates the air-pump; B, a reducing-valve which may be employed, if desired; C, an engineer's valve; D, a train or main supply pipe; E, a brake-cylinder with storage or expansion chamber F connected therewith, (instead of chamber F an independent auxiliary reservoir may be used, if desired;) G, a piston with its rod and retracting-spring, and H, a conductor's valve, all of which may be of the character shown or any other approved construction, as the same do not in their individual characters embody any points of my invention, but simply form elements of the general system.

D′ is a branch leading from the train or main supply pipe D to the brake-cylinder E and storage or expansion chamber F, provided with the usual cock *d* for cutting off the cylinder from the main supply-pipe D, when desired.

On the branch pipe D′, (of each car,) between it and the cylinder E, I place an automatic compound exhaust-valve K, provided with two exhaust-valves, one for the cylinder and one for the train (or main) pipe, which are so connected with the main pipe and the cylinder as to be actuated the instant the equilibrium between the two is disturbed, and on a branch *d′*, leading from branch pipe D′, I place check-valve-operating device L, having mechanisms for multiplying the pressure in the main pipe and transmitting it to the check-valve 29 of the expansion-chamber, (or independent auxiliary reservoir, if such is used,) so as to overcome the pressure on the check-valve of the air in the expansion-chamber.

The automatic compound exhaust-valve I prefer to construct substantially as shown in Figs. 2 and 3—that is to say, within a suitable case or shell, preferably composed of two sections, (an upper section 1 and a lower section 2, having suitable ports 3 and 4 leading to the main supply-pipe and to the cylinder,) I place two exhaust-valves, one for the main pipe (or train-pipe) and one for the cylinder, and so connect them that their action shall be dependent one on the other and both on the equilibrium of pressure in the main pipe and cylinder.

The shell-section 1, which is connected with the train-pipe D by its port 3, has in it an exhaust-valve 5, provided with a suitable seat-plug 6, and, if desired, a light spring 7, to hold it to its seat, though the spring 7 is not absolutely necessary. On the stem of valve 5 is a pin 8, which engages in the forks on the short arms of valve-lever 9, which lever has its fulcrum on the shell 1, as at 10, while the opposite or long arms of valve-lever 9 are pivoted, as at 11, to a stem 12, which carries at its lower end the exhaust-valve of the cylinder.

The upper end of stem 12 may move in a guide 13 in shell-section 1, if desired. At substantially its middle it is provided with a valve 14, having its seat on an annular disk 15, through which the stem 12 passes, said disk being supported on a flexible diaphragm 16, which may be held between the shell-sections 1 and 2, so as to divide the shell into two chambers, the upper one of which communicates with the main pipe D, while the lower communicates with the cylinder E.

Encircling the valve-stem 12, above the diaphragm 16, and pressing down on the valve 14, is a spring 17, which is inclosed by a perforated cage 18, secured to the disk 15, and consequently to the diaphragm 16 also, so that the valve 14 can only open when pressure from above forces down diaphragm 16 and disk 15.

49 indicates perforations or small ports in the vertical flange of disk 15, which permit any water of condensation which may accumulate above the diaphragm to pass through valve 14 into the lower section 2 of the shell and thence out of the valve through exhaust-port 20.

In the face of valve 14 (or its seat, if preferred) is a small leakage-groove 19, which is necessary to counteract any accidental slight leakage in the main pipe and preserve the equilibrium on diaphragm 16 when the brakes are not to be applied.

The lower shell-section 2, which is connected with the cylinder by its port 4, has an exhaust-port 20, which is normally closed by the exhaust-valve 21 on the lower end of stem 12. This valve 21 is loosely connected to the lower end of stem 12 by a pin 22 and elongated slot 23, so that the stem 12 has some upward movement before it is compelled to lift the valve 21, which is necessary, or if not absolutely necessary, at least desirable, in order that the diaphragm 16 may be sensitive and respond quickly to the slightest disturbance of the equilibrium by change of pressure in the main pipe D. The slot 23 is also elongated to give clearance above pin 22, so that there may be sufficient downward movement of stem 12 to insure the seating of exhaust-valve 5.

In the socket of valve 21 are small ports or holes 24, so that it can clear itself of any dust which might enter between the stem 12 and socket, as it is very desirable that the play or movement between the stem 12 and valve 21 (before alluded to) should not be interfered with. It will be noted that the power exerted on the exhaust-valve 5 to open the same (or the effect of any given reduction of pressure in the main supply-pipe, which is the same thing) can be proportioned and multiplied, first, by changing the proportions of the arms of valve-lever 9, and, secondly, by varying the relative area of the surfaces of diaphragm 16. It should also be noted that the two exhaust-valves 5 and 21 should be proportioned to the capacity of the main pipe D and cylinder E, in order to get the best results, though I do not herein confine myself to any specific proportions. The operation of this valve will be hereinafter described along with that of the check-valve-operating device and the whole system of which it forms a material part.

I will next describe the preferred form of check-valve-operating device, referring for that purpose to Fig. 4 of the drawings. This check-valve-operating device, as before specified, is placed on a branch pipe *d'*, leading from branch D' to the expansion-chamber F, (or to an auxiliary reservoir, as the case may be,) and is preferably constructed with a shell composed of three sections 25, 26, and 27. The top section 25, whose port 28 connects with expansion-chamber F, (or an auxiliary reservoir,) is fitted with the usual or any approved check-valve 29, having valve-spring 30 and valve-spring cap 31. The stem 32 of this valve projects into the chamber of shell-section 25. Shell-section 27 connects by its port 33 with branch pipe *d'*, and thence with the branch pipe D' to the main (or train) pipe and to the cylinder E.

34 indicates a tubular stem provided with two annular flanges, one 35 toward the main (or train) pipe, which is of greater area than the other 36, which is toward the expansion-chamber, and these two annular flanges 35 and 36 serve to connect the tubular stem 34 with diaphragms 37 and 38, suitable washers and nuts or equivalent means being employed for that purpose. The diaphragms 37 and 38 are in turn held between the shell-sections 25, 26, and 27, so that a hollow stem and diaphragms, the area of whose surfaces is less on the side 36 toward the expansion-chamber and greater on the side 35 next the main air-supply, is obtained.

The hollow stem 34 is capped above, as at 39, has small ports 40 for the passage of air at that end, is arranged in line with the stem 32 of the check-valve 29, and is normally held away from the stem of the check-valve by a spring 41 in the chamber of shell-section 26.

The chamber of shell-section 26 does not communicate with those of sections 25 and 27, but may connect with the outer air, if desired, as it has no special function other than to hold spring 41. This spring 41 is not absolutely necessary, but is desirable.

The pressure-reduction valve, as shown in the drawings, consists of a valve 42, having a stem 43 encircled by a spring 44, which bears on a follower 45 controlled by the threaded valve-rod 46, so that said spring 44 may be caused to exert more or less pressure on the valve 42, accordingly as the spring is compressed or relaxed, the pressure in the train-pipe being that of the reservoir minus the amount of pressure required to balance the downward pressure of the spring.

If it is desired to apply the brakes at low pressure—say only enough to produce a slight braking-pressure, which is desirable sometimes—as, for instance, in descending long grades—set the reducing-valve at thirty pounds less than the pressure in the main reservoir. Then apply the brakes, which application will necessarily be at the pressure then in the system. Next release the brakes, which will deplete the system, after which give the system air, which, owing to the set of the reduction-valve, it will now take at a pressure of thirty pounds, and when the brakes are next applied it will be at a pressure of thirty (30) pounds minus the loss by expansion.

In a little time an engineer can learn how to apply and maintain approximately any desired pressure.

I do not herein claim the construction or operation of the reducing-valve, but have thus described it because some reducing-valve or its equivalent is a desirable addition to my system.

I will now describe the operation of my system, presupposing that by some suitable means the desired braking-pressure has been obtained and maintained.

The main (or train) pipe being given air at the desired pressure, the air will pass by branch pipes D' *d'* simultaneously to cylinder E and expansion-chamber F until piston G (which is held back by its retracting-spring) is in equilibrium or there is an equal pressure on both sides of the piston. There being at the time of charging the system no air under pressure in expansion-chamber F, the check-valve 29 will readily open and permit the ingress of air. In case of the automatic or compound exhaust-valve K, there being no air under pressure in the cylinder, the pressure on top of diaphragm 16 will depress the same and open valve 14, flowing through the same to the cylinder E. Thus in a short time the equilibrium between the air in the train-pipe D, the cylinder E, and the expansion-chamber F will be established. If, now, the pressure on main-pipe D be suddenly lowered, even very slightly, the equilibrium of pressure on diaphragm 16 of first automatic valve K will be disturbed, and the pressure (from the cylinder) on the under side of diaphragm 16 being greatest will carry up stem 12, and through valve-lever 9 multiply the power and motion on exhaust-valve 5, opening the same full, so that the wave of reduction will pass instantly along the main pipe to the succeeding valves of the series, being intensified as it advances. During the first slight movement of stem 12, necessary to partially open the exhaust-valve 5 of the main pipe, the stem does not pick up valve 21, because of the oblong slot 23 and the play allowed thereby between valve 21 and stem 12; but the instant the exhaust-valve 5 has been partially opened, so as to still further reduce the pressure on the top of diaphragm 16, the stem 12 picks up the valve 21, which it can now readily do, as the downward pressure thereon is not equal to the reduction of pressure on the upper side of diaphragm 16, caused by the opening of exhaust-valve 5. The cylinder and the main pipe are thus exhausted substantially in the same instant of time, and so quickly that the exhaust may be termed "explosive," and the reducing-wave in the main pipe passes so rapidly from valve to valve as to almost equal electrical force. In experiments with twelve cylinders and connecting train-pipe aggregating four or five hundred feet the twelve valves were operated so as to apply the brakes in three-quarters of a second. Should the air-pressure in the main pipe D be slowly reduced by leakage, the leakage-groove 19 will permit a sufficient flow of air from one to the other side of diaphragm 16 to maintain the equilibrium and prevent the application of the brakes. This sudden, complete, and explosive exhaust from the main pipe also removes the pressure instantly from diaphragm 37 of the check-valve-operating device next to the main pipe, and the expansion of the air operating on the diaphragm 38, assisted by the spring 41, (see Fig. 4,) forces diaphragm 37 on stops 50, permitting check-valve 29 to be instantly closed by the expansion of the air in expansion-chamber F and its spring 30, thus preventing any material loss of pressure in expansion-chamber F. Were it not for this rapid or explosive exhaust the equalizer could not be effectively used, as a slow exhaust in the main pipe might prevent the quick closure of the check-valve, and thus greatly reduce the pressure of the air in expansion-chamber F. The continued expansion of the air in expansion-chamber F applies the brake in the usual manner.

In the present equilibrio systems the brakes cannot be released until the pressure in the main pipe and cylinder has been brought up to or slightly greater than the pressure of the retained air in expansion-chamber F.

In my system, in order to release the brakes, air is again given to the system. This air first passes to valve K, closes exhaust-valve 5, and exerts its force on diaphragm 16 until it overcomes the light spring 17, depresses diaphragm 16, opens valve 14, closes exhaust-valve 21, and enters cylinder E. The air also at the same time enters the check-valve-operating device, passes through the hollow stem 34, and exerts its pressure on the diaphragms 37 and 38.

For purposes of further explanation we will suppose the pressure in expansion-chamber F to be sixty (60) pounds, the area of check-valve 29 to be .2 of an inch, the area of upper diaphragm 38 to be 3.1 inches, and the lower diaphragm 37, or that next to the main pipe D, 4.4 inches.

| | |
|---|---|
| Now the pressure exerted on the check-valve 29 will be | .2×60=12 lbs. |
| When the pressure in main pipe D and cylinder E has reached ten (10) pounds the pressure on diaphragm 38 will be | 3.1×10=31 lbs. |
| Or a total of | 43 lbs. |
| While the upward pressure on diaphragm 37 will be | 4.4×10=44 lbs. |

The pressure on diaphragm 37 will therefore cause the tubular stem 34 to rise and trip the check-valve 29, whereupon the pressure in the brake-cylinder E and in expansion-chamber F will be instantly equalized. The piston G, being in equilibrio, is retracted by its spring, instantly releasing the brakes. The pressure is then raised to the desired pressure in the system, as pointed out at the beginning of the description of the operation of the devices.

In Fig. 6 is shown a modification in the arrangement of the connection between the equalizing-valve L and the automatic supply and exhaust valve K, wherein the check-valve-operating device, instead of being connected with the main pipe D or branch pipe D′ by pipe $d'$, is connected directly to the valve K by pipe $d^2$, which is the equivalent of the pipe $d'$ connection. The advantages of this arrangement are that it is brought nearer to the more powerful exhaust of the cylinder and its operation in permitting the drop of the check-valve is simultaneous with the exhaust of the cylinder and more forcible. In this arrangement the reservoir will receive its air through the chamber of valve K and not directly from the main pipe.

The term "a balanced valve," as used hereinafter in the statement of claim, relates to the mechanism through the movement of which, by variations in train-pipe pressure, the fluid-pressure is transmitted or exhausted in the normal operation of the brakes.

What I claim herein, and desire to secure by Letters Patent, is—

1. In a main-valve-operating mechanism for automatic fluid-pressure railway-brakes, the combination of a movable diaphragm arranged to be moved in one direction by the train-pipe pressure to release the brakes, and to be moved in the reverse direction by a reduction of train-pipe pressure to apply the brakes, an exhaust-passage leading from the train-pipe to the external atmosphere, and a train-pipe exhaust-valve controlling said passage and arranged in the valve-casing so as to be opened by the moving diaphragm on a reduction of train-pipe pressure, substantially as set forth.

2. In an air-brake system, the combination, with a balanced valve, of an exhaust-valve for the cylinder and an exhaust-valve for the train-pipe, said exhaust-valves independent of each other, but connected with and actuated by the balanced valve, substantially as and for the purposes specified.

3. In an air-brake system, the combination, with a cylinder, an expansion-chamber, and a main (or train) pipe, of an exhaust-valve arranged to open the cylinder for applying the brakes, and a check-valve-operating device arranged to operate the check-valve and equalize the pressure in the cylinder and expansion-chamber when the pressure in the main pipe is raised to release the brakes, substantially as and for the purposes specified.

4. In an air-brake system, the combination, with a cylinder, an expansion-chamber, and a main (or train) pipe for supplying air under pressure to the cylinder and expansion-chamber, of a check-valve-operating device having diaphragms of unequal area, the opposite sides of said diaphragms connected by a port and arranged in the pipe or passage leading to the expansion-chamber to multiply the pressure in the main (or train) pipe sufficiently to overcome the check-valve when the pressure in the expansion-chamber is greater than the pressure in the main supply-pipe, substantially as and for the purposes specified.

5. In an air-brake system, the combination, with a cylinder, an expansion-chamber having a check-valve, and a main (or train) pipe for supplying air under pressure to the cylinder and expansion-chamber, of two diaphragms of unequal area connected by a tubular stem and arranged in the port or passage leading to the expansion-chamber, whereby the pressure in the main air-supply pipe is multiplied and applied to operate the check-valve, substantially as and for the purposes specified.

6. In an air-brake system, the combination, with a cylinder, an expansion-chamber, and a main air-supply (or train) pipe, of a reduction-valve, an exhaust-valve arranged to open the cylinder, an exhaust-valve arranged to open the train-pipe, and a check-valve-operating device arranged to operate the check-valve of the expansion-chamber when the pressure is raised in the main pipe to release the brakes, substantially as and for the purposes specified.

7. In an air-brake system, the combination, with a brake-cylinder and a main air-supply (or train) pipe, of a valve-chamber having a diaphragm provided with a valve-seat, a valve therefor, and two exhaust-valves, one for the main air-supply pipe and one for the cylinder, said valves connected with the diaphragm so as to be actuated thereby, substantially as and for the purposes specified.

8. In an air-brake system, the combination, with a brake-cylinder and a main air-supply (or train) pipe, of a valve-chamber having a flexible diaphragm provided with a valve-seat, a valve therefor, an exhaust-valve for the cylinder connected directly to the stem of the diaphragm-valve, and an exhaust-valve for the main air-supply (or train) pipe connected to the diaphragm valve-stem by an interposed lever having a fulcrum, substantially as and for the purposes specified.

9. In an air-brake system, the combination, with a cylinder, an expansion-chamber, and a main (or train) pipe, of an exhaust-valve arranged to open the train-pipe, and a check-valve-operating device arranged to operate the check-valve and equalize the pressure in the cylinder and expansion-chamber when the pressure in the train-pipe is raised to release the brakes, substantially as and for the purposes specified.

10. In an air-brake system, the combination, with a cylinder, an expansion-chamber, and a main supply (or train) pipe, of a check-valve-operating device arranged to be actuated by the pressure in the main pipe to operate the check-valve of the expansion-chamber when the pressure in the main pipe is lower than that of the expansion-chamber, substantially as and for the purposes specified.

In testimony whereof I have affixed my signature in presence of two witnesses.

HERMAN GUELS.

Witnesses:

R. H. WHITTLESEY,

GEORGE H. CHRISTY.